(12) United States Patent
FanChiang et al.

(10) Patent No.: US 7,773,153 B2
(45) Date of Patent: Aug. 10, 2010

(54) FRAME-BASED PHASE-LOCKED DISPLAY CONTROLLER AND METHOD THEREOF

(75) Inventors: Hsu-lin FanChiang, Hsinchu (TW); Jui-hung Hung, Hsinchu (TW); Hui-min Tsai, Hsinchu (TW)

(73) Assignee: Mstar Semiconductor, Inc., Jhubei (TW)

( * ) Notice: Subject to any disclaimer, the term of this patent is extended or adjusted under 35 U.S.C. 154(b) by 1265 days.

(21) Appl. No.: 11/316,290

(22) Filed: Dec. 22, 2005

(65) Prior Publication Data
US 2006/0170823 A1    Aug. 3, 2006

Related U.S. Application Data

(60) Provisional application No. 60/647,428, filed on Jan. 28, 2005.

(51) Int. Cl.
H04N 9/475    (2006.01)
(52) U.S. Cl. .................. 348/536; 348/512; 348/540; 348/547
(58) Field of Classification Search ............. 348/505, 348/540, 547, 194, 537–538, 516, 521, 524, 348/511, 411, 447–448, 458, 558, 554–555, 348/536, 512; 327/147, 146, 149–151, 155–156, 327/159–160, 166; 345/131; H04N 9/475
See application file for complete search history.

(56) References Cited

U.S. PATENT DOCUMENTS

| | | | |
|---|---|---|---|
| 4,558,349 A | 12/1985 | Sasaki | |
| 4,727,432 A | 2/1988 | Hosaka | |
| 4,847,678 A | 7/1989 | McCauley | |
| 5,347,365 A | 9/1994 | Harigai et al. | |
| 5,721,570 A | 2/1998 | Tsunoda et al. | |
| 6,316,974 B1 * | 11/2001 | Taraci et al. | 327/147 |
| 7,359,007 B2 * | 4/2008 | Wu | 348/581 |
| 7,450,178 B2 * | 11/2008 | Choi et al. | 348/537 |
| 2002/0041335 A1 | 4/2002 | Taraci et al. | |

FOREIGN PATENT DOCUMENTS

EP    0705034 A2    4/1996

* cited by examiner

Primary Examiner—Trang U Tran (57) ABSTRACT

A frame-based phase-locked display controller used in a display system and method thereof are described. The frame-based phase-locked display controller for displaying a plurality of image frames in a video signal comprises a frame-based phase-locked loop and a synchronization signal generator. The frame-based phase-locked loop receives an oscillating signal and an input vertical synchronous signal to generate an output clock signal by phase-lock loop based on the frames. The synchronization signal generator, coupled to the frame-based phase-locked loop, receives the output clock signal to generate an output horizontal synchronous signal, an output vertical synchronous signal and an output display enable (DE) signal. The frame-based phase-locked loop comprises a first PLL, a frequency synthesizer, a second PLL, a fast phase detector, a phase frequency detector and an active pixel region generator. The active pixel region generator receives an input vertical synchronous signal to generate a reference signal associated with an active pixel region. The frame-based phase-locked loop frame-based phase-locks the display enable signal to the reference signal.

30 Claims, 7 Drawing Sheets

FRAME-BASED PHASE-LOCKED DISPLAY CONTROLLER AND METHOD THEREOF

This application is related to and claims priority to Provisional Application Ser. No. 60/647,428, entitled "Low Cost TV Controller and Associated Method," filed on Jan. 28, 2005.

FIELD OF THE INVENTION

The present invention generally relates to a display controller and method thereof, and more particularly, to a frame-based phase-locked display controller and method thereof.

BACKGROUND OF THE INVENTION

Figure 1:
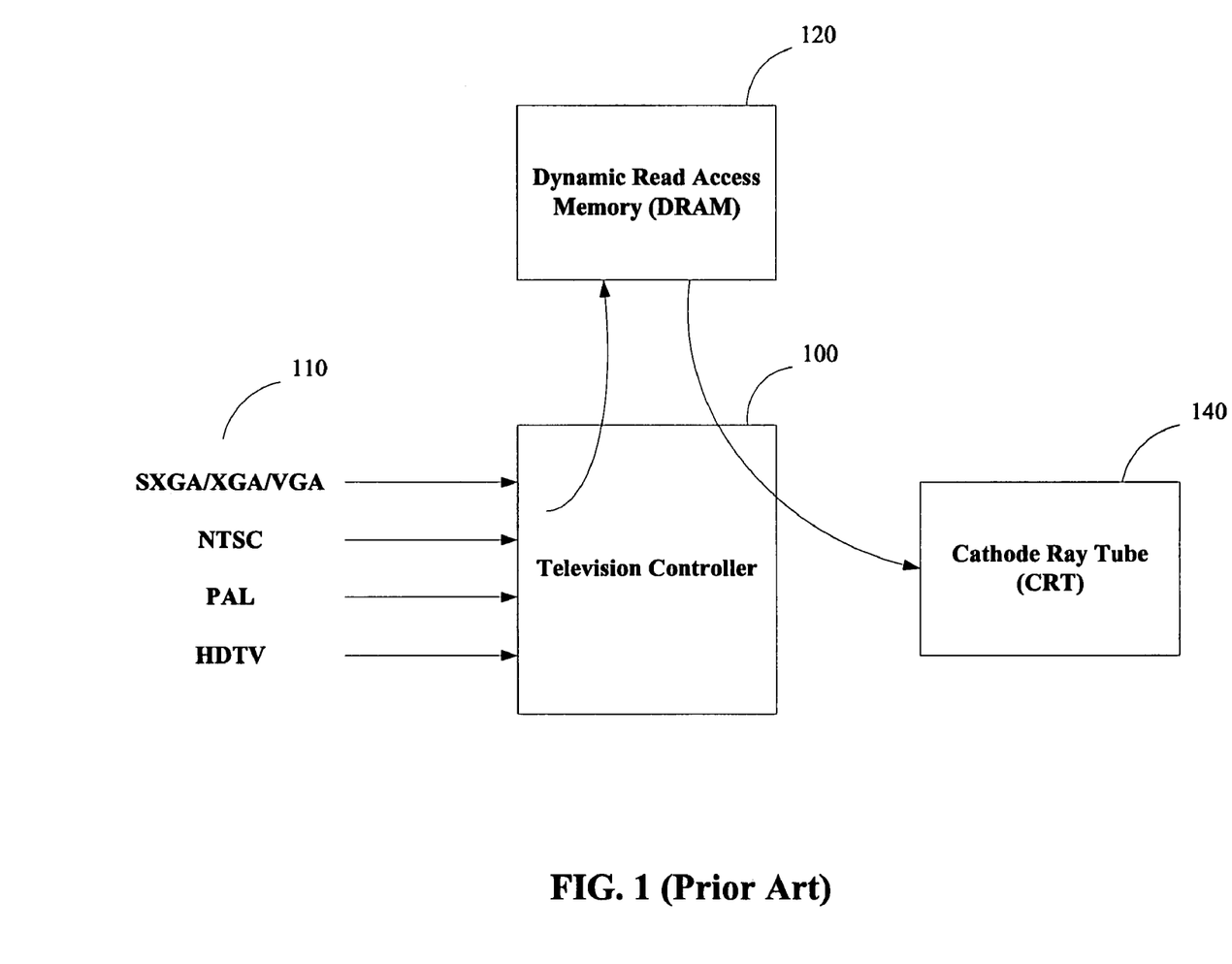
FIG. 1 shows a conventional block diagram of a TV system.

FIG. 1 illustrates a conventional block diagram of a television (TV) system. The TV system mainly includes a TV controller 100, dynamic random access memory (DRAM) 120, and a cathode ray tube (CRT) 140. The TV controller 100 is capable of receiving a plurality of types of video sources 110, including signals of National Television Standards Committee (NTSC) TV, Phase Alternation Line (PAL) TV, and video signals of super extended graphics array (SXGA)/extended graphics array (XGA)/video graphics array (VGA). The DRAM 120 is necessarily required to store frame data generated by the video sources 110 in FIG. 1. The TV controller 100 then properly displays frame data in the DRAM 120 to the CRT 140. The CRT 140 displays the video signal according to vertical synchronous (VSYNC) and horizontal synchronous (HSYNC) signals (not shown in FIG. 1) generated by the TV controller 100.

However, the DRAM 120 increases the total manufacturing cost of the display system. Further, the CRT 140 cannot change VSYNC and HSYNC signals dramatically. The VSYNC and HSYNC signals can only vary their frequencies under vendor's specific specification, such as the specification of VSYNC signal within 5% and HSYNC signal within 2%. Otherwise the CRT 140 will be seriously damaged or the CRT video display is seriously distorted on the CRT 140. The VSYNC signal is 60 Hz and 50 Hz for NTSC and PAL standards, respectively. SXVGA/XGA/VGA video signals may support a plurality of kinds of VSYNC operation frequencies, preferably ranging from 60 Hz to 85 Hz.

In the prior art, the TV controller 100 separates the input frame data from the output frame data by buffering frame data into the DRAM 120, so the output video signals composed of the output frame data can merely be controlled under approximate fixed frequencies of VSYNC and HSYNC signals to stably display the video signals. Specifically, when a different video source is selected into the TV controller 100 or when the display mode is changed, the TV controller 100 may distort video signals on the CRT 140 or even damage the CRT 140 due to the VSYNC and HSYNC signal variations.

Figure 2:
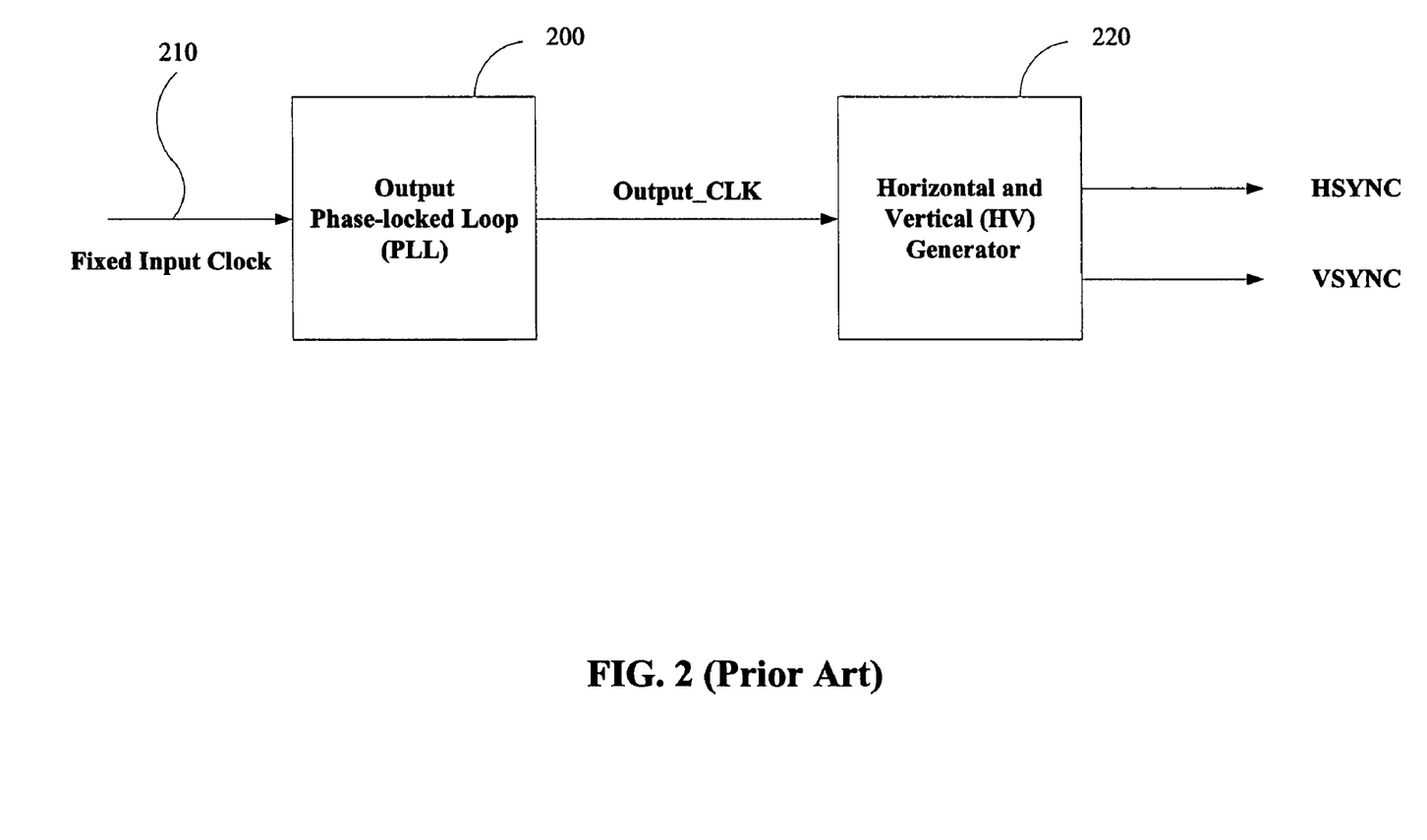
FIG. 2 shows a block diagram of the conventional TV controller in FIG. 1.

FIG. 2 shows a block diagram of the conventional TV controller in FIG. 1. The TV controller 100 comprises an output phase-locked loop (PLL) 200 and a horizontal and vertical (HV) generator 220. The output PLL 200 receives a fixed input clock 210 and then outputs Output_CLK signal. The HV generator 220 generates VSYNC and HSYNC signals according to Output_CLK signal. The conventional display controller processes image frames based on pixels. Persons skilled in the art considers CRT TV cannot be implemented without the DRAM 120 since the output VSYNC signal must change significantly to cause the CRT to be seriously damaged or cause the CRT video display to be seriously distorted when the input TV video source is changed. It's unacceptable by the manufactures of the display systems, and especially damaging CRT TV is too dangerous.

As aforementioned, either CRT or LCD controller, of which conventional PLL receives a fixed input clock, cannot afford the demand of different video sources and DRAM increases the manufacturing cost of display systems. Consequently, there is a need to develop a display controller to provide the display system with rapid adjustment of VSYNC and HSYNC signals for reducing the cost and improving stability thereof.

SUMMARY OF THE INVENTION

One object of the present invention is to provide a frame-based phase-locked display controller and method thereof to detect a phase difference between a reference signal and a display enable (DE) signal to reduce the cost of the memory used in different types of TVs.

Another object of the present invention is to provide a frame-based phase-locked display controller and method thereof to adjust the frequency of an output vertical and a horizontal synchronous signal according to the phase difference in response to different display mode change for a predetermined video source or different video source change.

Still another object of the present invention is to provide a frame-based phase-locked display controller and method thereof to detect an input vertical synchronous signal of TV to generate the reference signal associated with an active pixel region of the video source.

According to the above objects, the present invention discloses a frame-based display controller for displaying a plurality of image frames in a video signal. The display controller comprises a frame-based phase-locked loop and a synchronization signal generator. The frame-based phase-locked loop receives an oscillating signal and an input vertical synchronous signal to generate an output clock signal by phase-lock loop based on the frames. The synchronization signal generator, coupled to the frame-based phase-locked loop, receives the output clock signal to generate an output horizontal synchronous signal, an output vertical synchronous signal and an output display enable (DE) signal. The frame-based phase-locked loop comprises a first PLL, a frequency synthesizer, a second PLL, a fast phase detector, a phase frequency detector and an active pixel region generator. The active pixel region generator receives an input vertical synchronous signal to generate a reference signal associated with an active pixel region. The frame-based phase-locked loop phase-locks the display enable signal to the reference signal according to the image frames.

The present invention further discloses a frame-based phase-lock method, comprising steps of: generating an output clock signal according to an oscillating signal; receiving an input vertical synchronous signal; generating a reference signal associated with an active pixel region according to the input vertical synchronous signal; generating an output horizontal synchronous signal, an output vertical synchronous signal and an output display enable (DE) signal according to the output clock signal. and performing a phase-locked loop based on a plurality of image frames.

A phase difference between the reference signal and the display enable signal is detected for converting the phase difference into an up/down signal. The output clock signal is synthesized in response to the up/down signal and the oscillating signal. The horizontal synchronous signal and the vertical synchronous signal are adaptively adjusted according to the phase difference. The step of performing the phase-lock loop adaptively phase-locks the display enable signal to the reference signal according to image frames. The output vertical synchronous signal is associated with the input vertical synchronous signal in a weak relationship.

The output vertical synchronous signal adaptively approaches the input vertical synchronous signal in response to a display mode change or a video signal source change. Preferably, a relationship between the display enable signal and the output vertical synchronous signal and a relationship between the reference signal and the input vertical synchronous signal are programmable. The output vertical synchronous signal adaptively approaches the input vertical synchronous signal when a distance between the output vertical synchronous signal and the input vertical synchronous signal exceeds a total length of a plurality of line buffers integrated in the display controller. Also, a stable signal is deasserted when the distance between the output vertical synchronous signal and the input vertical synchronous signal exceeds the total length of line buffers in order to temporarily disable the output display of the display controller.

The step of generating the output clock signal clamps a frequency of output clock signal. Each assertion of the output horizontal synchronous signal associates with one complete scan line. The step of generating the output horizontal synchronous signal comprises the steps of: counting a horizontal count value to generate the output horizontal synchronous signal; and counting a vertical count value to generate the output vertical synchronous signal. The adaptively adjusting step modifies the horizontal count value and the vertical count value to fast adjust the horizontal synchronous signal, the vertical synchronous and the in response to the phase difference.

The present invention can reduce the cost of the external memory used in the CRT TV by adaptively adjusting the phase difference between a reference signal and display enable signal in response to different video sources or display mode change.

DETAILED DESCRIPTION OF THE PREFERRED EMBODIMENTS

The present invention is directed to a frame-based phase-locked display controller and method to detect a phase difference between a reference signal and DE signal by a fast phase detector and a phase frequency detector to reduce the cost of the external memory, e.g. DRAM, used in the different types of TVs, including CRT and LCD TV. The frame-based PLL adjusts the frequency of a vertical and a horizontal synchronous signal by compensating a synchronization signal generator according to the phase difference in response to different display mode change for a predetermined video source or different video source change to CRT or LCD TV. Moreover, an active pixel region generator detects an input vertical synchronous signal of TVs to generate the reference signal associated with an active pixel region of the video source so that the output vertical synchronous signal of synchronization signal generator catches up the input vertical synchronous signal. It should be noted that the video signal is preferably generated by the video source, including SXGA, XGA, VGA, HDTV, NTSC, PAL standards and any types of TV signals.

Figure 3:
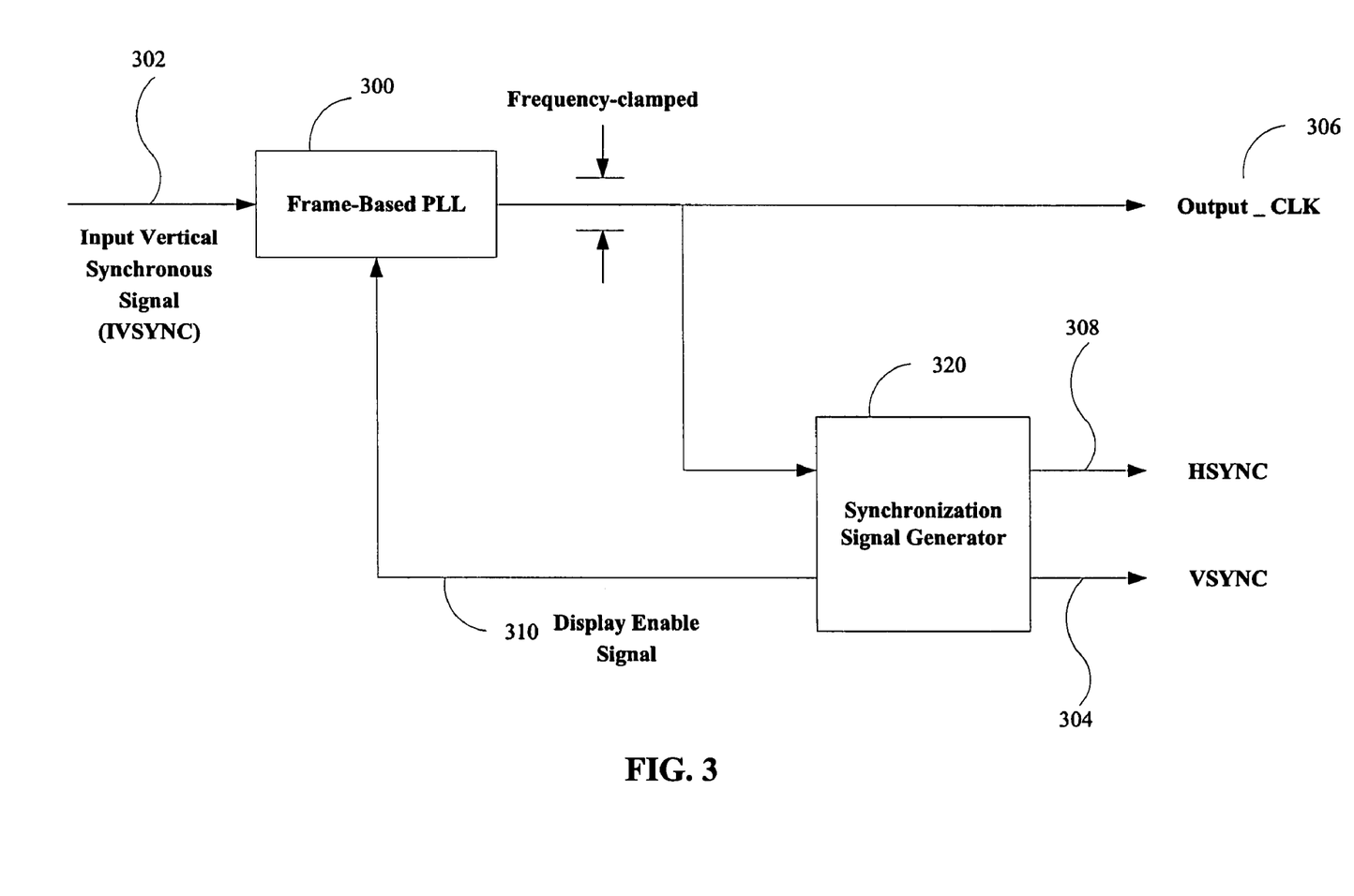
FIG. 3 illustrates a novel architecture of low cost display controller having a frame-based PLL according to one embodiment of the present invention.

FIG. 3 shows the novel architecture of low cost display controller having the frame-based PLL 300 to save DRAM component according to the present invention. An input vertical synchronous signal (IVSYNC) 302 is blocked from the output vertical synchronization (VSYNC) signal 304 by a frame-based PLL 300. The frame-based PLL 300 performs frequency clamping for Output_CLK 306, so that the VSYNC signal 304 keeps a weak relationship with the IVSYNC signal 302. The synchronization signal generator 320 generates the VSYNC signal 304 and a horizontal synchronization (HSYNC) signal 308 according to Output_CLK 306. The Output_CLK 306 is properly frequency-clamped according to vendor's setting so as to prevent the monitor from being damaged, especially the CRT. A DE signal 310 of the synchronization signal generator 320 is also feedbacked to the frame-based PLL 300. According to the present invention, the frequency of Output_CLK's 306 is changed properly without varying the phase of VSYNC signal 304 too quickly. Therefore, the frame-based PLL 300 can save the DRAM component and CRT TV is effectively protected from being damaged by the VSYNC signal 304. The VSYNC signal 304 and HSYNC signal 308 can be adaptively adjusted in response to the IVSYNC signal under vendor's specification, such as VSYNC signal within 5% and HSYNC signal within 2%.

Figure 4:
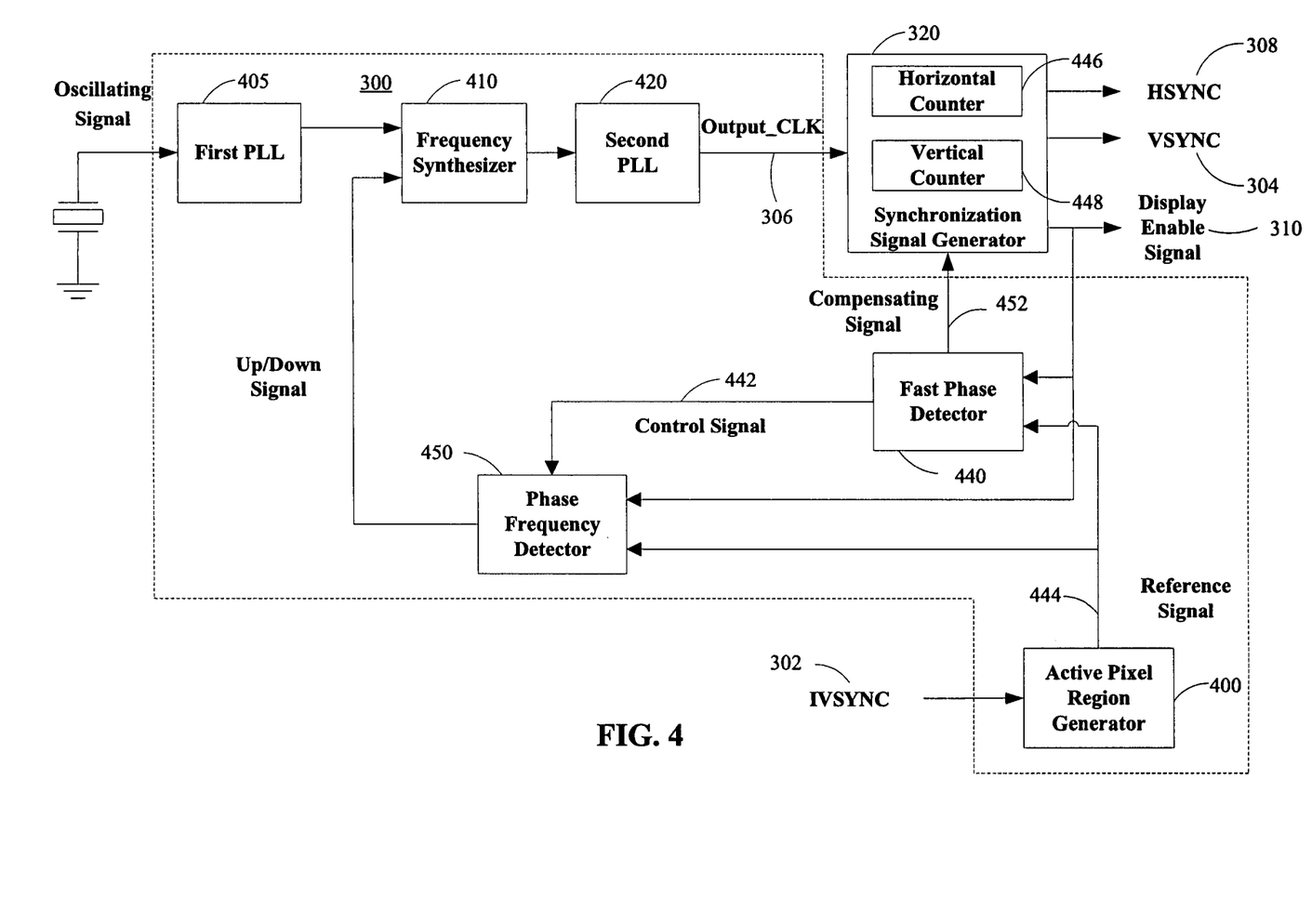
FIG. 4 illustrates a detailed block diagram of the display controller having a frame-based PLL in FIG. 3 according to one embodiment of the present invention.

FIG. 4 shows a detailed block diagram of the display controller having a frame-based PLL 300 in FIG. 3 according to one embodiment of the present invention. The display controller with the frame-based PLL 300 for displaying a plurality of image frames in a video signal comprises an active pixel region generator 400, a fast phase detector 440, a frequency synthesizer 410, a synchronization signal generator 320, and a phase frequency detector 450. In this embodiment, the phase frequency detector (PFD) 450 is coupled to the synchronization signal generator 320 and the frequency synthesizer 410 is arranged in a feedback path.

The active pixel region generator 400 detects the IVSYNC signal 302 to generate a reference signal 444 associated with an active pixel region of the video signals, in response to the IVSYNC signal 302. Persons skilled in the art may note that the relationship between reference signal 444 and IVSYNC signal 302 is programmable. The phase frequency detector 450 coupled to the active pixel region generator 400 detects a phase difference between the reference signal 444 and DE signal 310 for converting the phase difference into an up/down signal. The frequency synthesizer 410 performs frequency synthesis according to the output of the first PLL 405 and the up/down signal of the phase frequency detector 450.

The synchronization signal generator 320 is coupled to the fast phase detector 440, the fast frequency detector 450 and the second PLL 420 of the frame-based PLL 300 to generate a HSYNC signal 308, a VSYNC signal 304 and the DE signal 310 according to Output_CLK signal 306 of the frame-based PLL 300. The DE signal 310 is feedbacked to the fast phase detector 440 to track the reference signal 444 of the active pixel region generator 400 to indicate the active output pixel region of the display system. The synchronization signal generator 320 feeds the fast phase detector 440 and the phase frequency detector 450 the DE signal 310. Persons skilled in the art should note that the relationship between the DE signal 310 and VSYNC signal 304 is programmable and substantially depends on the display specification. As a result, VSYNC signal 304 generated by the synchronization signal generator 320 is associated with IVSYNC signal 302 of the active pixel region generator 400 in a weak relationship due to a video signal source change or a video mode change.

In one preferred embodiment of the present invention, the synchronization signal generator 320 comprises a horizontal counter 446 and a vertical counter 448. The horizontal counter 446 counts a first predetermined value for each output horizontal synchronization tip. The vertical counter 448 counts a second predetermined value for each output vertical synchronization assertion. The relationship between the DE signal 310 and VSYNC signal 304 is programmable, for example, to substantially comply with the display specification of the CRT.

The fast phase detector 440 is coupled to the active pixel region generator 400, the phase frequency detector 450 and the synchronization signal generator 320. Further, the fast phase detector 440 detects the phase difference between the reference signal 444 and the DE signal 310 for generating a control signal 454 and the compensating signal 452. The fast phase detector 440 compensates the synchronization signal generator 320 through the compensating signal 452 for adjusting the phase difference between IVSYNC signal 302 and VSYNC signal 304 in order to rapidly phase-lock IVSYNC signal 302 to VSYNC signal 304 with respect to the reference signal 444. For example, the fast phase detector 440 signals the synchronization signal generator 320 to compensate ten HSYNC lines for each frame when the phase difference between IVSYNC signal 302 and VSYNC signal 304 exceeds a predetermined threshold. Preferably, the fast phase detector 440 disables the phase frequency detector 450 via the control signal 454 when the fast phase detector 440 compensates the synchronization signal generator 320 via the compensating signal 452.

Additionally, the first PLL 405 is coupled to the frequency synthesizer 410 to receive an oscillating signal from an oscillator. The second PLL 420 couples between the frequency synthesizer 410 and the synchronization signal generator 320. The first PLL 405 generates an output frequency lower than that of Output_CLK signal 306 of the frame-based PLL 300 so as to improve the EMI problem for the display system.

The active pixel region generator 400 can block the relationship between IVSYNC and VSYNC signals when the frequency of Output_CLK 306 exceeds a predetermined limitation defined by vendors to protect the CRT. The frame-based PLL 300 free-runs except the active pixel region generator 400. For example, the CRT can display a blue screen disregarding the IVSYNC signal.

Referring to FIG. 4 again, a feedback control path to the synchronization signal generator 320 is created by the phase frequency detector 450, which detects the phase difference between VSYNC signal 304 and IVSYNC signal 302. The phase frequency detector 450 adjusts VSYNC signal 304, HSYNC signal 308 and DE signal 310 by tuning the frequency and phase of the Output_CLK. The frame-based PLL 300 adaptively adjusts the frequency of VSYNC signal 304 and HSYNC signal 308 by compensating the synchronization signal generator 320 according to the phase difference to respond to different video sources or display mode change for the same video source outputted to CRT or LCD TV.

Assuming the display mode change of display system occurs, the phase difference between VSYNC signal 304 and IVSYNC signal 302 is, for example, 100 scan lines associated with HSYNC signal 308. Apparently, conventional TV controller cannot allow changing 100 scan lines of HSYNC signal 308 without DRAM. For example, the phase frequency detector 450 tracks phase exponentially. The fast phase detector 440 forwards a control signal 442 to enable or disable the phase frequency detector 450, and a compensating signal 452 of the fast phase detector 440 is transmitted into the synchronization signal generator 320 to compensate HSYNC signal.

The fast phase detector 440 preferably signals the synchronization signal generator 320 to digitally compensate each frame for a plurality of scan lines, e.g. ten scan lines, for HSYNC signal when the phase difference of VSYNC signal 304 exceeds a predetermined threshold of phase difference. Meanwhile, preferably, the fast phase detector 440 disables the phase frequency detector 450 by the control signal 442 while the fast phase detector 440 is adjusting the synchronization signal generator 320. Therefore, the stable period of the frame-based PLL 300 due to the display mode change is considerably reduced so as to meet the display specification of the display system.

In one embodiment, when the display mode of a CRT is changed to operate under 60 Hz of SXGA having a frame resolution of 1280×1024 pixels, CRT displays 60 frames per second and 1024 scan lines for each frame. The synchronization signal generator 320 generates HSYNC signal 308 and VSYNC signal 304 according to horizontal counter 446 and vertical counter 448, respectively. Preferably, the fast phase detector 440 signals the synchronization signal generator 320 to compensate the horizontal counter 446 when the phase difference exceeds the display specification. For example, the value in the horizontal counter 446 is modified for the horizontal line compensation, and associated operation of the line buffers (not shown in FIG. 4) in the display controller is effected accordingly.

Preferably, each assertion of the HSYNC signal associates with one complete scan line, which can refer to U.S. application Ser. No. 10/908,473 filed on May 23, 2005 by the same Assignee for further detailed description.

Figure 5:
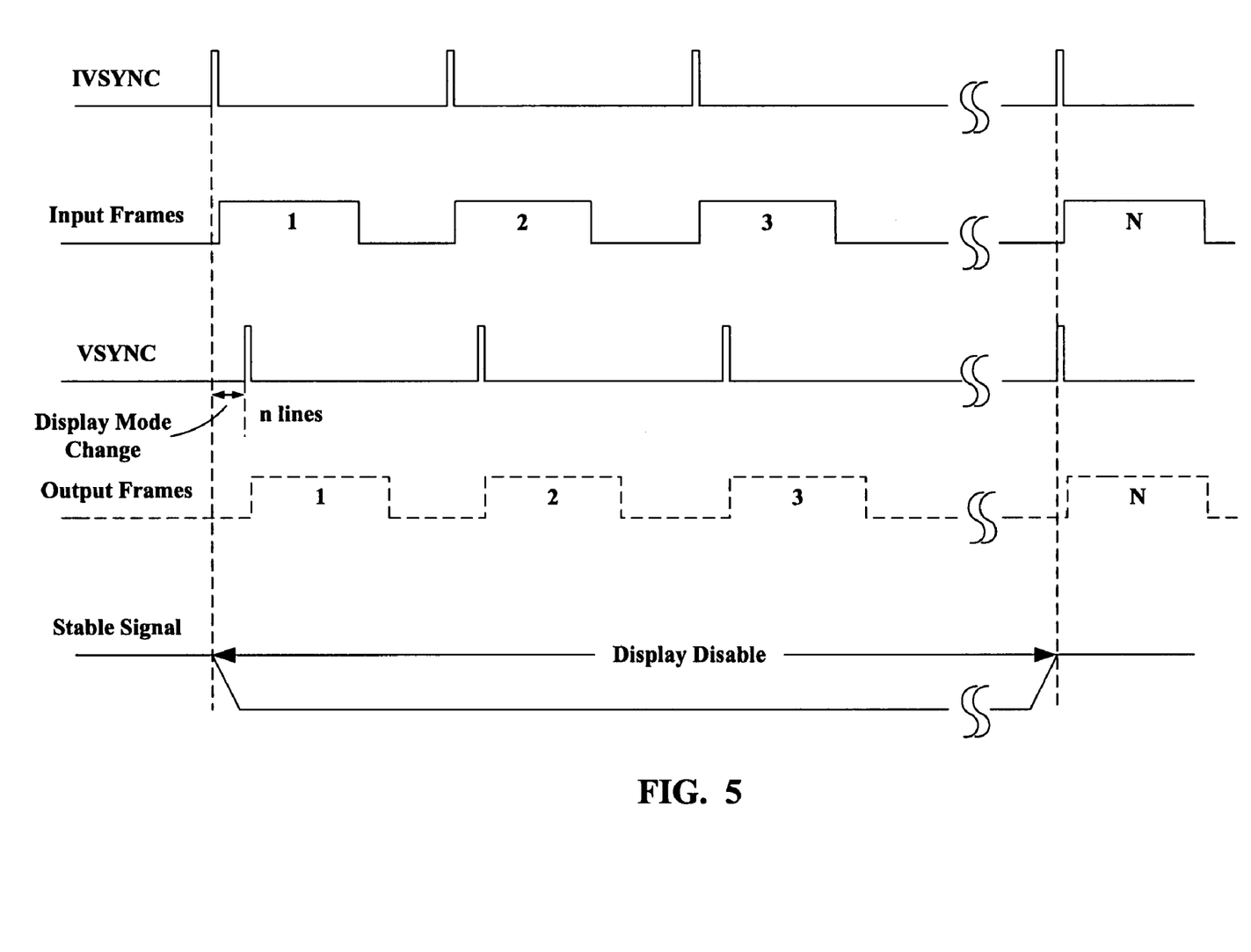
FIG. 5 illustrates a timing diagram associated with IVSYNC signal and the adjusting VSYNC signal according to one embodiment of the present invention.

FIG. 5 illustrates a timing diagram associated with the IVSYNC signal 302 and the adjusting VSYNC signal 304 according to one embodiment of the present invention. The IVSYNC signal 302 directly associates with the input video signal, i.e. the input frames in the video signal associates with the IVSYNC signal 302. When the display mode of display system is changed, a phase difference of n scan lines initially exists between IVSYNC signal 302 and VSYNC signal 304, and a stable signal is then deasserted to disable outputting the frames. VSYNC signal 304 adaptively catches up to the IVSYNC signal 306 after a plurality of VSYNC assertions. Please note that the timing diagram is for explanation and, actually, there might requires a period more than 40 IVSYNC signal assertions to catch up to the phase difference between IVSYNC signal 302 and VSYNC signal 304 without damaging CRT and causing any display distortion. After the VSYNC signal 304 catches up with the IVSYNC signal 302, the stable signal is asserted to enable the display of the output frames. The stable signal is deasserted when a phase distance between IVSYNC signal 302 and VSYNC signal 304 exceeds the total length of the line buffers in order to temporarily disable the display output of the display controller. Therefore, the end user will not conceive any display distortion.

Therefore, the VSYNC signal 304 adaptively keeps a weak relationship with the IVSYNC signal 302. Moreover, after the VSYNC signal 304 catches up to the IVSYNC signal 302, VSYNC signal 304 may not be exactly aligned to IVSYNC signal 302. The above embodiment shows the DE signal 310 catches up the reference signal 444. The DE signal 310 may not be exactly aligned with the reference signal 444. Preferably, after the DE signal 310 catches up with the reference signal 444 within the number of line buffers integrated in the low cost display controller, the stable signal is asserted to enable the CRT to normally display. For example, if five line buffers are integrated in the low cost display controller, the DE signal 310 preferably catches up with the reference signal 444 within five scan lines and the stable signal is then asserted to enable the display system to prevent any possible underrun or overrun problems. In other words, during the adjusting period, the IVSYNC signal 302 is rapidly adjusted but meets the display specification by using the horizontal counter 446 or vertical counter 448 so that the VSYNC signal 304 keeps a weak relationship with the IVSYNC signal 302. More importantly, the fast phase detector 440 and the phase frequency detector 450 adaptively frame-based phase-lock VSYNC signal 304 to IVSYNC signal 302 at a high performance.

Figure 6:
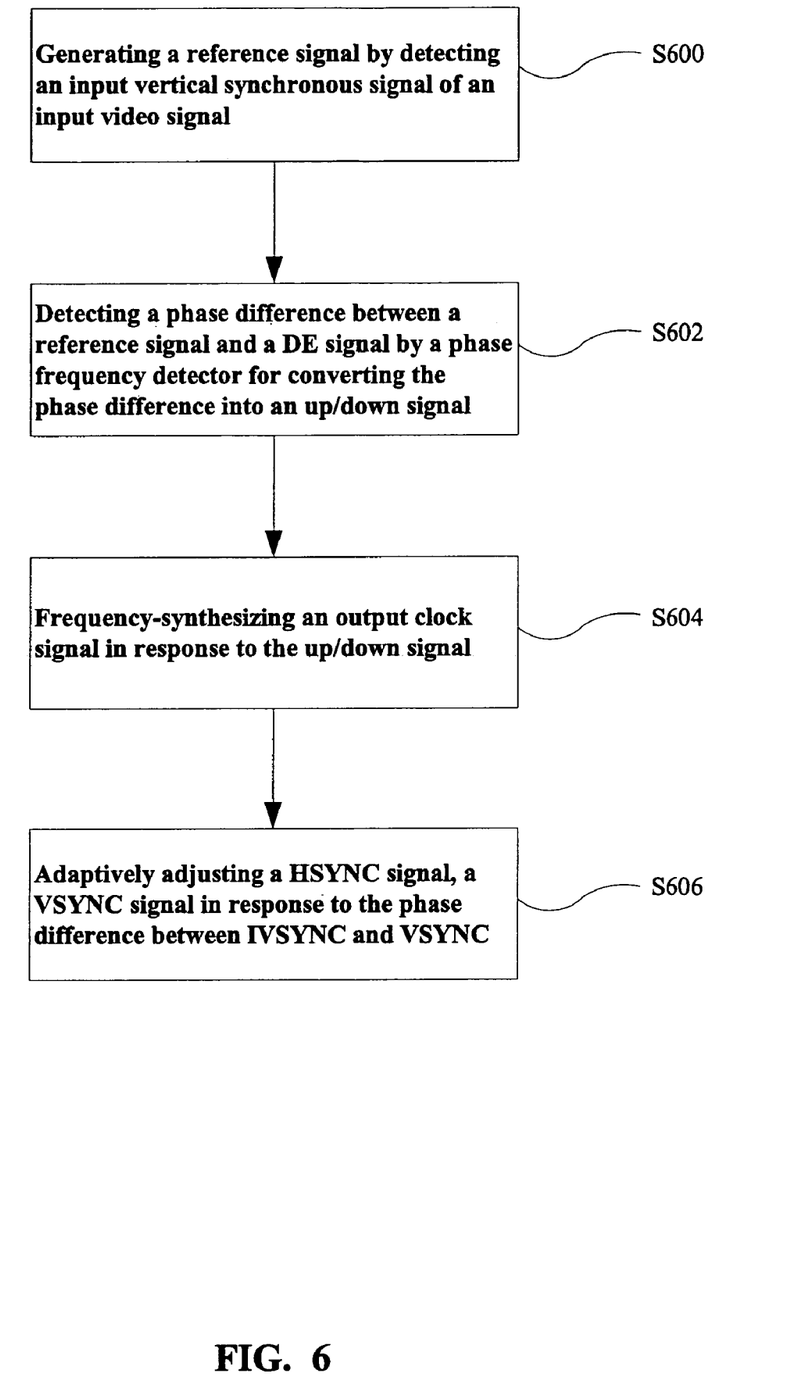
FIG. 6 shows a flow chart of performing a frame-based phase lock according to one embodiment of the present invention.

FIG. 6 shows a flow chart of performing a frame-based phase lock according to one embodiment of the present invention. Starting at step S600, a reference signal is generated by detecting the IVSYNC signal of an input video signal. The reference signal is associated with the IVSYNC signal. In step S602, a phase difference between a reference signal and a DE signal is detected by a phase frequency detector for converting the phase difference into an up/down signal. In step S604, an output clock signal is frequency-synthesized in response to the up/down signal.

Thereafter, in step S606, a HSYNC signal, a VSYNC signal and the DE signal are adaptively adjusted in response to the phase difference between IVSYNC and VSYNC. In this embodiment, the HSYNC signal, the VSYNC signal and the DE signal are generated according to Output_CLK signal. The DE signal which indicates the active output pixel region is forwarded to the fast phase detector to catch up with the reference signal of the active pixel region generator. The fast phase detector detects the phase difference between the reference signal and the DE signal for generating a control signal and a compensating signal. The control signal selectively enables the phase frequency detector according to a predetermined threshold to control the output of the up/down signal, and the compensating signal compensates the synchronization signal generator for adaptively adjusting the HSYNC signal, the VSYNC signal and the DE signal according to the phase difference between IVSYNC and VSYNC signals so that VSYNC signal is capable of rapidly approaching the IVSYNC signal with respect to the reference signal. Preferably, the control signal of the fast phase detector disables the phase frequency detector while the compensating signal is generated by the fast phase detector to compensate the synchronization signal generator. Preferably, a horizontal counting value and a vertical counting value are counted according to Output_CLK signal and the HSYNC signal, VSYNC signal and DE signal are adaptively adjusted in response to the phase difference of IVSYNC signal and VSYNC signal.

Figure 7:
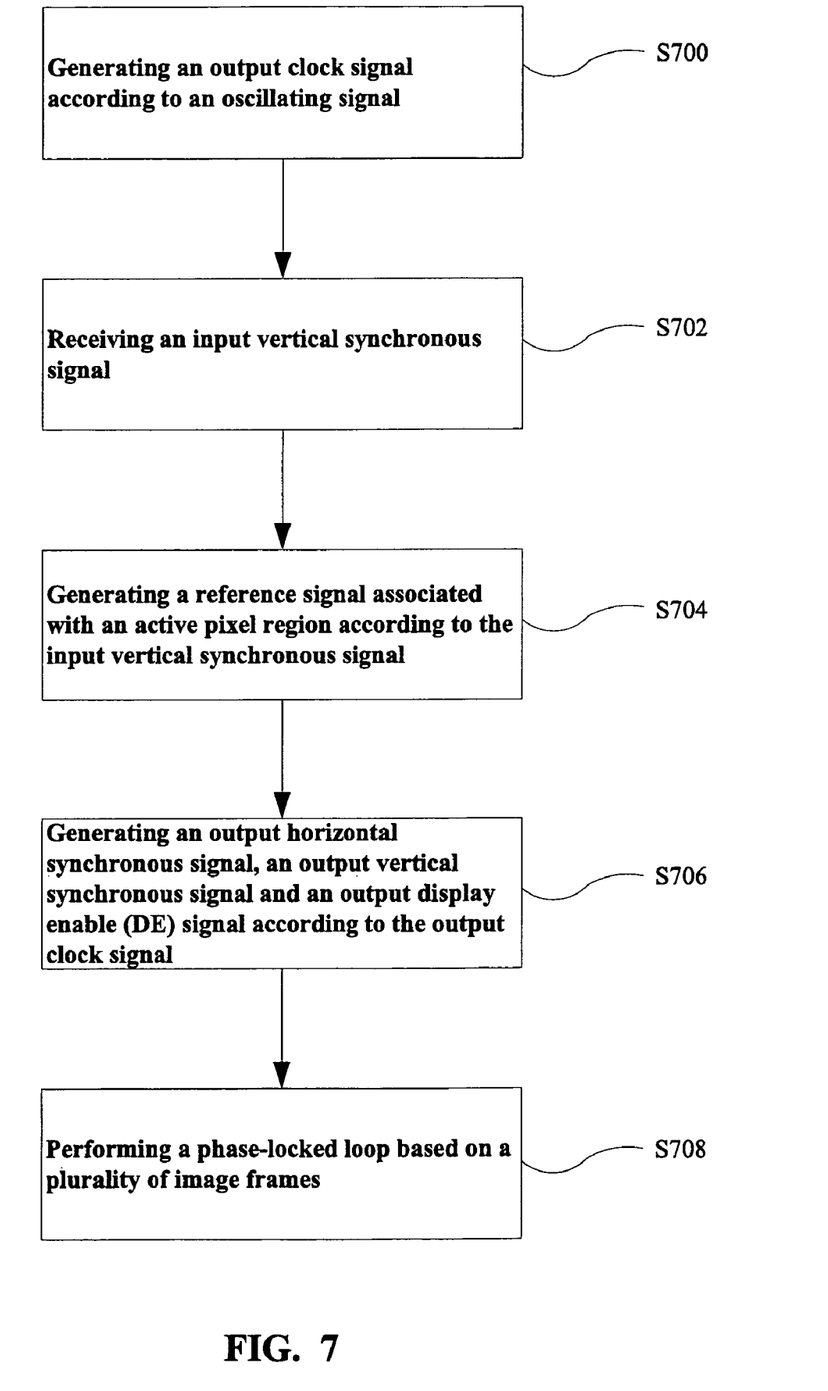
FIG. 7 shows a flow chart of performing a frame-based phase-lock method according to another embodiment of the present invention.

Referring to FIG. 7, a frame-based phase-lock method is disclosed according to one embodiment of the present invention further discloses. In step S700, an output clock signal is generated according to an oscillating signal. In step S702, receive an input vertical synchronous signal IVSYNC. In step S704, a reference signal associated with an active pixel region is generated according to the input vertical synchronous signal IVSYNC. In step S706, an output horizontal synchronous signal, an output vertical synchronous signal and an output display enable (DE) signal are generated according to the output clock signal. Finally, in step S708, perform a phase-locked loop based on a plurality of image frames.

More specifically, a phase difference between the reference signal and the display enable signal is detected for converting the phase difference into an up/down signal. The output clock signal is synthesized in response to the up/down signal and the oscillating signal. The horizontal synchronous signal and the vertical synchronous signal are adaptively adjusted according to the phase difference. The step of performing the phase-lock loop adaptively phase-locks the display enable signal to the reference signal according to several image frames. The output vertical synchronous signal is associated with the input vertical synchronous signal in a weak relationship.

The output vertical synchronous signal adaptively approaches the input vertical synchronous signal in response to a display mode change or a video signal source change. Preferably, a relationship between the display enable signal and the output vertical synchronous signal and a relationship between the reference signal and the input vertical synchronous signal are programmable. The output vertical synchronous signal adaptively approaches the input vertical synchronous signal when a distance between the output vertical synchronous signal and the input vertical synchronous signal exceeds a total length of a plurality of line buffers integrated in the display controller. Also, a stable signal is deasserted when the distance between the output vertical synchronous signal and the input vertical synchronous signal exceeds the total length of line buffers in order to temporarily disable the output display of the display controller.

The step of generating the output clock signal clamps a frequency of output clock signal. Each assertion of the output horizontal synchronous signal associates with one complete scan line. The step of generating the output horizontal synchronous signal comprises the steps of: counting a horizontal count value to generate the output horizontal synchronous signal; and counting a vertical count value to generate the output vertical synchronous signal. The adaptively adjusting step modifies the horizontal count value and the vertical count value to fast adjust the horizontal synchronous signal, the vertical synchronous and the in response to the phase difference.

To sum up, the present invention discloses a frame-based phase-locked display controller for displaying a plurality of image frames in a video signal. The display controller comprises a frame-based phase-locked loop and a synchronization signal generator. The frame-based phase-locked loop receives an oscillating signal and an input vertical synchronous signal to generate an output clock signal based on the image frames. The synchronization signal generator, coupled to the frame-based phase-locked loop, receives the output clock signal to generate an output horizontal synchronous signal, an output vertical synchronous signal and an output display enable (DE) signal.

Preferably, the frame-based phase-locked loop comprises a first PLL, a frequency synthesizer, a second PLL, a fast phase detector, a phase frequency detector and an active pixel region generator. The active pixel region generator receives an input vertical synchronous signal to generate a reference signal associated with an active pixel region. The frame-based phase-locked loop phase-locks the display enable signal to the reference signal according to the image frames.

The present invention can reduce the cost of the external memory used in the CRT TV by adaptively adjusting the phase difference between the input vertical synchronous signal and the output vertical synchronous signal in response to different video sources or display mode change.

As is understood by a person skilled in the art, the foregoing preferred embodiments of the present invention are illustrative rather than limiting of the present invention. It is intended that they cover various modifications and similar arrangements to be included within the spirit and scope of the appended claims, the scope of which should be accorded the broadest interpretation so as to encompass all such modifications and similar structure.

What is claimed is:

1. A frame-based phase-locked display controller for displaying a plurality of image frames in a video signal, the display controller comprising:
   a frame-based phase-locked loop for receiving an oscillating signal and an input vertical synchronous signal to generate an output clock signal based on said image frames, the frame-based phase-locked loop comprising:
      an active pixel region generator for receiving the input vertical synchronous signal to generate a reference signal associated with an active pixel region;
      a phase frequency detector, for detecting a phase difference between the reference signal and an output display enable (DE) signal to convert said phase difference into an up/down signal;
      a first PLL for receiving said oscillating signal;
      a frequency synthesizer, coupled to said first PLL, for receiving said up/down signal; and
      a second PLL, coupled to said frequency synthesizer, for generating said output clock signal; and
   a synchronization signal generator, coupled to said frame-based phase-locked loop, for receiving said output clock signal to generate an output horizontal synchronous signal, an output vertical synchronous signal and the output display enable (DE) signal.

2. The display controller of claim 1, wherein said frame-based phase-locked loop adaptively phase-locks said display enable signal to said reference signal according to said image frames.

3. The display controller of claim 1, wherein said output vertical synchronous signal of the synchronization signal generator is associated with said input vertical synchronous signal in a weak relationship.

4. The display controller of claim 1, wherein said output vertical synchronous signal adaptively approaches said input vertical synchronous signal in response to a display mode change.

5. The display controller of claim 1, wherein said output vertical synchronous signal adaptively approaches said input vertical synchronous signal when said video signal is switched to another video signal.

6. The display controller of claim 1, wherein said output vertical synchronous signal adaptively approaches said input vertical synchronous signal when a distance between said output vertical synchronous signal and said input vertical synchronous signal exceeds a total length of a plurality of line buffers integrated in said display controller.

7. The display controller of claim 1, wherein said second PLL clamps a frequency of said output clock signal.

8. The display controller of claim 1, wherein said frame-based phase-locked loop further comprises a fast phase detector for detecting the phase difference between said reference signal and said display enable signal to generate a compensating signal to adjust said synchronization signal generator.

9. The display controller of claim 8, wherein said fast phase detector disables said phase frequency detector through a control signal while said fast phase detector is adjusting said synchronization signal generator.

10. The display controller of claim 8, wherein said video signal complies with a standard selecting from one group consisting of SXGA, XGA, VGA, HDTV, NTSC and PAL standards.

11. The display controller of claim 8, wherein a relationship between said display enable signal and said output vertical synchronous signal is programmable.

12. The display controller of claim 8, wherein said display enable signal indicates an active output pixel region.

13. The display controller of claim 8, wherein each assertion of said output horizontal synchronous signal associates with one complete scan line.

14. The display controller of claim 8, wherein said synchronization signal generator comprises:
   a horizontal counter for counting a horizontal value to generate said output horizontal synchronous signal; and
   a vertical counter for counting a vertical value to generate said output vertical synchronous signal.

15. The display controller of claim 14, wherein said synchronization signal generator modifies said horizontal value and said vertical value in response to said compensating signal.

16. The display controller of claim 1, wherein said display controller is capable of displaying said image frames on a cathode ray tube (CRT).

17. A frame-based phase-locked method for a plurality of image frames in a video signal, comprising the steps of:
   generating an output clock signal according to an oscillating signal by a frame-based phase-locked loop;
   receiving an input vertical synchronous signal by the frame-based phase-locked loop;
   generating a reference signal associated with an active pixel region according to said input vertical synchronous signal;
   generating an output horizontal synchronous signal, an output vertical synchronous signal and an output display enable (DE) signal by a synchronization signal generator according to said output clock signal;
   detecting a phase difference between said reference signal and said display enable signal for converting the phase difference into an up/down signal;
   synthesizing said output clock signal according to said up/down signal and said oscillating signal; and
   performing an adaptive phase-locked loop based on said image frames.

18. The frame-based phase-locked method of claim 17, further comprising a step of adaptively adjusting said output horizontal synchronous signal and said output vertical synchronous signal according to said phase difference.

19. The frame-based phase-locked method of claim 17, wherein said step of performing the phase-locked loop adaptively phase-locks said display enable signal to said reference signal according to said image frames.

20. The frame-based phase-locked method of claim 17, wherein said output vertical synchronous signal is associated with said input vertical synchronous signal in a weak relationship.

21. The frame-based phase-locked method of claim 17, wherein said output vertical synchronous signal adaptively approaches said input vertical synchronous signal in response to a display mode change or said video signal change.

22. The frame-based phase-locked method of claim 17, wherein a relationship between said display enable signal and said output vertical synchronous signal is programmable.

23. The frame-based phase-locked method of claim 17, wherein a relationship between said reference signal and said input vertical synchronous signal is programmable.

24. The frame-based phase-locked method of claim 17, wherein said step of generating said output clock signal clamps a frequency of said output clock signal.

25. The frame-based phase-locked method of claim 17, wherein each assertion of said output horizontal synchronous signal associates with one complete scan line.

26. The frame-based phase-locked method of claim 17, wherein said output vertical synchronous signal adaptively approaches said input vertical synchronous signal when a distance between said output vertical synchronous signal and said input vertical synchronous signal exceeds a total length of a plurality of line buffers integrated in said display controller.

27. The frame-based phase-locked method of claim 26, wherein a stable signal is deasserted when said distance between said output vertical synchronous signal and said input vertical synchronous signal exceeds said total length of said line buffers in order to temporarily disable the output display of said display controller.

28. The frame-based phase-locked method of claim 18, wherein said phase difference exceeds a predetermined threshold.

29. The frame-based phase-locked method of claim 18, wherein said step of generating said output horizontal synchronous signal and said output vertical synchronous signal comprises the steps of:
counting a horizontal count value to generate said output horizontal synchronous signal; and
counting a vertical count value to generate said output vertical synchronous signal.

30. The frame-based phase-locked method of claim 29, wherein said adaptively adjusting step modifies said horizontal count value and said vertical count value to fast adjust said output horizontal synchronous signal, said output vertical synchronous signal in response to said phase difference.

* * * * *